| United States Patent [19] | [11] Patent Number: 5,938,717 |
|---|---|
| Dunne et al. | [45] Date of Patent: Aug. 17, 1999 |

[54] SPEED DETECTION AND IMAGE CAPTURE SYSTEM FOR MOVING VEHICLES

[75] Inventors: Jeremy G. Dunne, Littleton; Patrick J. Delohery; Samuel J. Andrews, both of Castle Rock; Charles Berger, Denver, all of Colo.

[73] Assignee: Laser Technology, Inc., Englewood, Colo.

[21] Appl. No.: 08/608,027

[22] Filed: Mar. 4, 1996

[51] Int. Cl.[6] .............................. G08G 1/01; G03B 7/091
[52] U.S. Cl. ............................ 701/117; 701/96; 701/119; 340/937
[58] Field of Search ...................... 364/436, 438, 364/426.044, 460, 565; 340/936, 937, 903, 905, 943, 435; 348/135, 142, 143, 148, 149, 221, 222, 227, 231, 232; 382/104; 358/909.1

[56] References Cited

U.S. PATENT DOCUMENTS

| | | | |
|---|---|---|---|
| 4,717,915 | 1/1988 | Goede | 342/66 |
| 4,847,772 | 7/1989 | Michalopoulos et al. | 364/436 |
| 4,887,080 | 12/1989 | Gross | 340/937 |
| 4,988,994 | 1/1991 | Loeven | 340/937 |
| 5,041,828 | 8/1991 | Loeven | 340/936 |
| 5,161,107 | 11/1992 | Mayeaux et al. | 364/436 |
| 5,335,041 | 8/1994 | Fox | 396/61 |
| 5,359,404 | 10/1994 | Dunne . | |
| 5,381,155 | 1/1995 | Gerber | 342/102 |
| 5,473,368 | 12/1995 | Hart | 348/155 |
| 5,477,264 | 12/1995 | Sarbadhikari et al. | 348/231 |
| 5,479,206 | 12/1995 | Ueno et al. | 348/211 |
| 5,515,042 | 5/1996 | Nelson | 340/937 |
| 5,563,590 | 10/1996 | Mira | 340/936 |
| 5,568,406 | 10/1996 | Gerber | 340/937 |

FOREIGN PATENT DOCUMENTS

WO94/28527 12/1994 Australia .

OTHER PUBLICATIONS

Red Brochure and Brochure with Price Sheet: (a) Published and distributed Feb. 1995; (b) Offers for sale, sales and public uses have been outside of the U.S.
Preliminary Users Guide–Laser Technology: (a) Published approx. Jun. 1995.
Code Base Users Guide: (a) Published 1988.
Zykronix Inc.—published Jan. 24, 1995.
Sato, "Radar Speed Monitoring System", IEEE Aug. 31–Sep. 2, 1994, pp. 89–93.

Primary Examiner—Tan Nguyen
Attorney, Agent, or Firm—John R. Wahl; William W. Cochran; Holland & Hart LLP

[57] ABSTRACT

A system for automatically capturing an image of a moving vehicle and recording data parameters, such as date, time, speed operator, location, etc. on the image. A capture window that comprises a predetermined range of distances of the system from the moving vehicle can be set by the operator so that the image of the moving vehicle is automatically captured when it enters the capture window. The capture window distance can be entered manually through a keyboard or automatically using the laser speed gun. Automatic focusing is provided using distance information from the laser speed gun. A database is included to allow the user to search for specified parameters. Data records can be flagged for issuance of citations. A separate office unit is disclosed for retrieving and sorting data records so that field units are not occupied with such tasks. The office unit can be separately connected to licensing databases to retrieve information for issuance of citations.

29 Claims, 9 Drawing Sheets

SPEED DETECTION AND IMAGE CAPTURE SYSTEM FOR MOVING VEHICLES

BACKGROUND OF THE INVENTION

A. Field of Invention

The present invention pertains generally to speed detection systems for moving vehicles, and more particularly to automatic speed detection systems that are capable of capturing an image of a moving vehicle.

B. Description of the Background

Various methods have been used in the past to detect the speed of moving vehicles. For example, radar systems have been developed that measure the Doppler frequency of a wave reflected from a moving vehicle that is mixed with the transmitted wave. These systems have been implemented in the X, K and Ka microwave bands.

More recently, lasers have been used to detect the speed of moving vehicles. Lasers operate in a somewhat different fashion than radar systems. Laser speed detectors measure the time delay between the transmission of a series of pulses and a reflection of those pulses from the moving vehicle. This time delay is an indication of the distance of the moving vehicle from the laser speed detector. By taking several such readings over a predetermined time period, the speed of the vehicle can be determined. Laser range finders and speed detection systems, such as that disclosed in U.S. Pat. No. 5,359,404 issued Oct. 25, 1994 entitled "Laser-Based Speed Measuring Device," U.S. patent application Ser. No. 08/375,945 filed Jan. 19, 1995, entitled "Laser Range Finder Having Selectable Target Acquisition Characteristics and Range Measuring Precision" (attorney docket number 35014.8306), U.S. patent application Ser. No. 08/375,941 filed Jan. 19, 1995, entitled "Self-Calibrating Precision Timing Circuit and Method for Laser Range Finder" (attorney docket number 35014.8307), and U.S. patent application Ser. No. 08/375,810 filed Jan. 19, 1995, entitled "Automatic Noise Threshold Determining Circuit and Method for a Laser Range Finder" (attorney docket number 35014.8308) are specifically incorporated herein by reference for all that they teach. Although laser speed detection devices can provide highly accurate measurements of the speed of a moving vehicle, alone they do not provide automated features that a user may find desirable.

For example, a system that is capable of recording an image of a moving vehicle together with the speed of the vehicle would facilitate the issuance of speeding tickets by providing evidence of the identity, speed, time and location of the vehicle. Such evidence could then be communicated directly to the registered owner together with a speeding citation. Various prior art systems have been capable of producing this type of composite image. For example, prior art radar based systems have been capable of printing out various data parameters on a picture that relate to time, date, speed limit and actual speed of the moving vehicle. This information, typically, has been placed on an image of the vehicle in an analog fashion.

TeleTraffic of Norway has developed a laser speed detection system called "Lastec" that records the time, date, speed limit and actual speed of a moving vehicle (data parameters) on an image of the vehicle in an analog fashion. The Lastec device uses a magnetic tape storage device for recording low light levels require lower F-stops which results in a shorter depth of field that causes the image to be difficult to focus. On the other hand, off-the-shelf electronic automatic gain control (AGC) systems typically do not provide an adjustment range that is sufficient to obtain images in bright sunlight as well as very low light conditions. Typical AGC systems generate a gain control signal that is supplied to the video amplifiers to adjust the gain of the video amplifiers to produce a constant video signal. Such systems do not, however, provide a sufficient range of adjustment for bright sunlight and low light level conditions. Additionally, such systems are incapable of controlling an exposure for flash illumination. Both mechanical iris exposure systems and standard built-in AGC electronic exposure systems for video cameras fail to provide a method of obtaining a proper exposure for a flash illumination of a target. Exposure systems that are provided with video cameras are not capable of setting exposures for flash illumination that are capable of capturing a single-image frame during a flash illumination.

Proper alignment of laser based speed detection systems has also been found to be difficult in prior art systems. In heavy traffic situations, the narrow laser beam allows the user to specifically pinpoint a particular target and obtain data parameters such as speed and distance of the moving vehicle with a high degree of precision. This type of precision was not available in radar systems because of the width of the radar beam. However, such precision requires a highly accurate alignment and targeting system to insure that data is being obtained from the proper target. It is also desirable to have a portable system that is capable and storing the image and data. The combined data and image comprise an information record. The Lastec system codes each of the information records with a bar code so that the information record can be located on the tape at a later date.

Although such prior art systems, such as the Lastec system, are capable of storing a large amount of data on a magnetic tape, the use of tape-based systems in a field unit is complex and awkward. Tape systems are bulky, require extra cabling, and awkward to use if the tape is to be removed and used on a base unit to print images. Additionally, tape systems only provide serial access, rather than at random access, which further slows the retrieval time for images. Also, since the data parameters such as the date, time, speed and speed limit are recorded in an analog fashion on the image, there is no way to search this data. It has also been found that the reliability of tape systems can be affected by changes in temperature. Moreover, tape systems that could be used in a portable system suffer from low data transfer rates necessitating the use of a high data transfer rate storage device, such as a hard disk, in combination with the tape system, thereby unnecessarily adding complexity and expense to the overall system.

Obtaining the proper exposure of the image of a moving vehicle has also been found to be difficult. Because of the high rate of speed of vehicles that are being detected, as well as changing conditions, the light level intensity of the moving vehicle can vary in a short period of time. Mechanical iris-type systems use a variable F-stop to maintain a proper exposure of the image. However, the response time of such mechanical systems can be too slow to obtain a properly exposed picture. Additionally, of maintaining precise alignment. Prior art systems have required elaborate alignment procedures during setup and elaborate targeting methods during data acquisition. Alignment can also be more complex when the field unit must be disposed within a weatherproof unit.

Use of weatherproof enclosures has also limited the ability of the user to externally focus the camera system. A change in the focal distance of the video camera may be required because of a change in the target acquisition distance or a change in the illumination frequency. Prior art devices have not provided a simple and easy method of adjusting the focus, especially when the imaging system is contained in a waterproof enclosure.

SUMMARY OF THE INVENTION

The present invention overcomes the disadvantages and limitations of the prior art by providing a system for recording an image of a moving vehicle and parameters associated with the image that includes an image detector that produces an image signal representative of the image of the moving vehicle, a parameter detector that generates a parameter signal representative of parameters associated with the image, and a storage device that has a removable storage medium that is capable of storing a plurality of image signals and parameters associated with those image signals.

The present invention also provides a system for storing an image of a moving vehicle and associated data parameters relating to the image that comprises an image detector that produces an image signal of the moving vehicle, a parameter detector that generates associated data parameters relating to the image, and a database processor coupled to the image detector and the parameter detector that stores the image signal and the associated data parameters and provides data parameter fields that can be searched by the data processor.

The present invention also provides a system for displaying an image of a moving vehicle and parameters associated with the image comprising an image detector that produces an image signal representative of the image of the moving vehicle, an exposure control device coupled to the image detector that monitors ambient light levels of the moving vehicle and adjusts the exposure period of the image detector based on the ambient light levels, a parameter detector that generates a parameter signal representative of the parameters associated with the image, and an image generator that is capable of generating the image of the moving vehicle together with the parameters associated with the image.

One advantage of the present invention is that data parameters that are produced by the laser gun and entered in the system by the user have associated data parameter fields that form part of a database system and can be searched by the user. The system also allows the user to flag certain records which can be later sorted for printing.

Another advantage of the present invention is that it provides an external exposure control board that can be programmed to provide the proper exposure for flash illumination of a target. Appropriate triggering devices are used to capture a video frame during a flash illumination for storage with the associated data parameters. The external exposure control board also provides a fast response, wide range exposure control signal to allow the system to quickly adapt to a wide range of intensities of the image. The electronic exposure control allows for greater depth of field at low light levels so that focusing accuracy is not critical.

Another advantage of the present invention is that the field unit of the present invention is maintained in a waterproof enclosure with access through a waterproof keyboard so that the system of the present invention can be employed in various weather conditions.

Another advantage of the present invention is that it uses a removable hard disk device that is capable of storing data at high data transfer rates, is reliable, is compact, is simple to use and is compatible with other computer systems so that expensive field units do not have to be employed as base units for retrieving data.

Another advantage of the present invention is that simple procedures are provided for alignment of targeting indicators that assures acquisition of data parameters from the intended target.

Another advantage of the present invention is that external focusing control of the video camera is provided for various target distances and various illumination frequencies.

Another advantage of the present invention is that a specified area of the image can be selected for generating exposure control data.

DETAILED DESCRIPTION OF THE PREFERRED EMBODIMENT OF THE INVENTION

Figure 1:
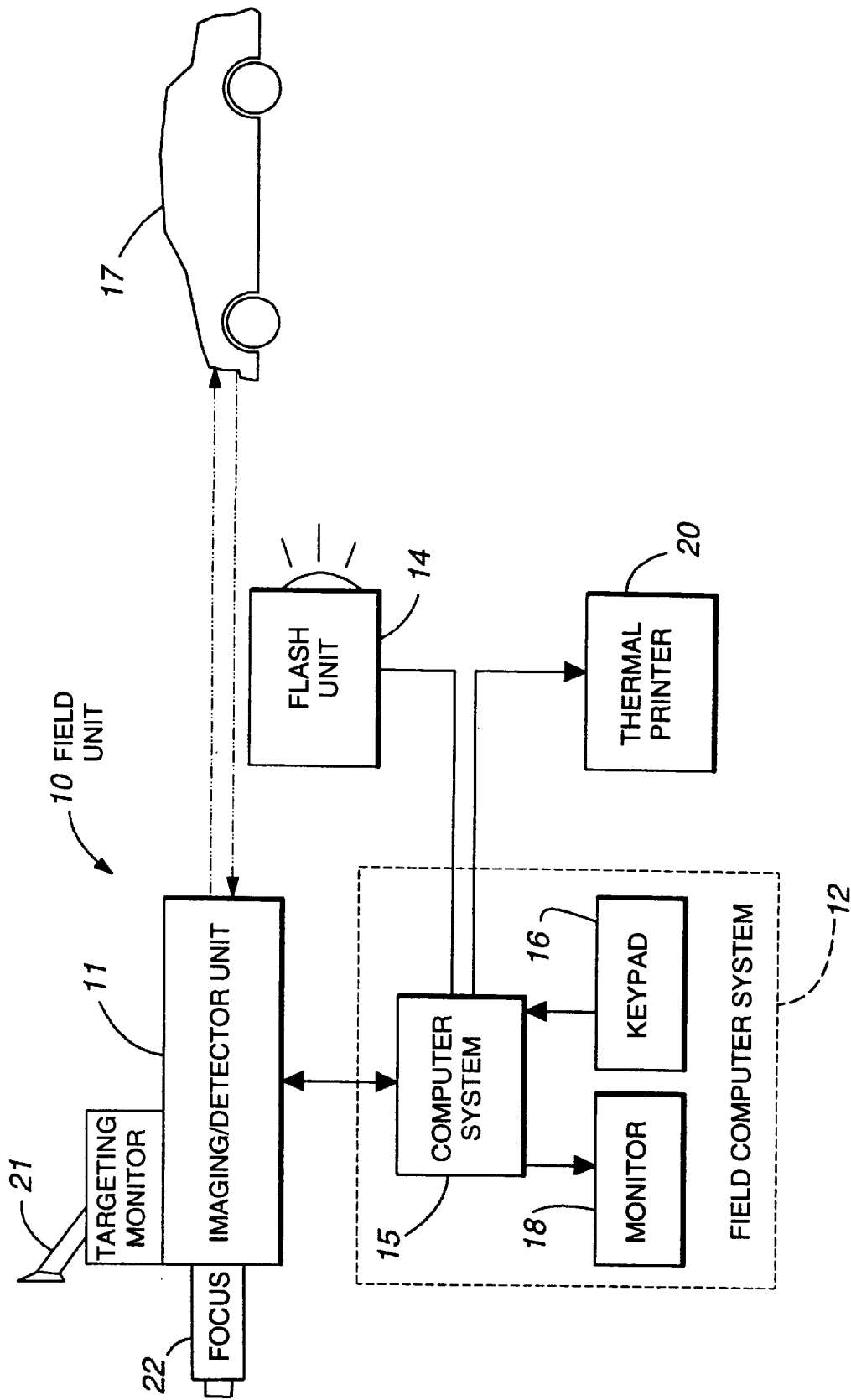
FIG. 1 is a schematic block diagram indicating the manner in which the system of the present invention is employed to detect moving vehicles.

FIG. 1 is a schematic illustration of the manner in which the present invention is implemented. As shown in FIG. 1, a field unit 10 comprises an imaging/detector unit 11, a field computer system 12 and an optional flash unit 14 for operation at night or low light level conditions. Thermal printer 20 may also be used in conjunction with field unit 10. As shown in FIG. 1, imaging/detector unit 11 is aligned with a moving vehicle 17 at a predetermined distance. The imaging/detector unit 11, under the control of field computer system 12 and keyboard 16, captures an image of the moving vehicle 17 together with data parameters relating to the captured image to form an information record. The data parameters include items such as the speed of the moving vehicle 17, the distance of the moving vehicle 17 from the imaging/detector unit 11, the date, time and location of the captured image, the speed limit at that location, the operator of the field unit 10, an identification of the particular field unit 10 and the date on which the field unit 10 was last aligned and calibrated. Field unit 10 also includes a video monitor 18, that displays video produced by the system. The field unit 10 may be operated in a capture mode, a browse mode, or live video mode for display on monitor 18.

As also shown in FIG. 1, a targeting monitor 21 can also be provided that displays live video of the image that is being produced by the video camera 40 (FIG. 2) that is disposed within the imaging/detector unit 11. Crosshairs are superimposed on the image that correspond to the location of the laser beam within the image. If the imaging/detector unit 11 is mounted, for example, on a tripod, it can be manually adjusted by the user to position the crosshairs on the location where a target will appear. Any suitable inexpensive and small monitor can be used as a target monitor 21, including an LCD monitor or the type used in a camcorder. Aiming of the imaging/detector unit 11 can be very accurate using a targeting monitor, or video monitor 18, because of the amplification of the image resulting from the use of the 200 mm lens of video camera 40. Alignment, in this manner, also eliminates the need for a sighting telescope that is attached to alignment plate 42 and carefully aligned with laser speed gun 38 and video camera 40.

FIG. 1 also shows a printer 20 that can be employed with the field unit 11 to provide hardcopy prints 26 (FIG. 2) of the information records that have been captured for various moving vehicles 17. The printer can be operated to sequentially print each information record captured by field unit 10, or can be operated to print only those information records that have been flagged by the user. Keypad 16 allows the user to adjust the mode of operation of the monitor 18 and printer 20, allows for browsing of captured images, positioning of targeting indicators such as cross-hairs, a manual setting of image capture parameters, and checking of memory usage. Focus control 22 on imaging/detector unit 11 allows for external focusing of a video camera which is part of the imaging/detector unit 11.

Figure 2:
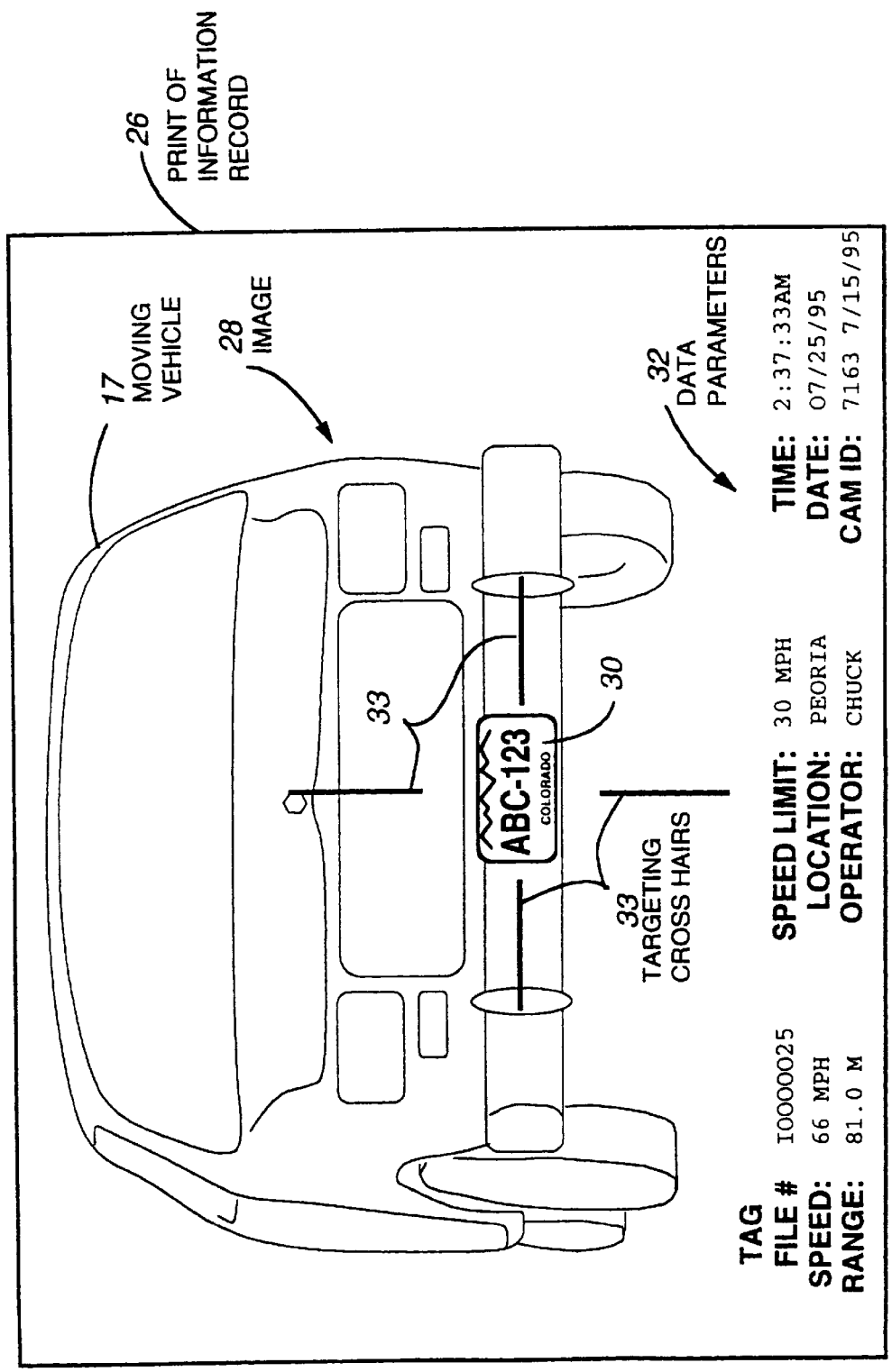
FIG. 2 is an illustration of an information record that can be obtained by the system of the present invention illustrating an image of the moving vehicle together with data parameters associated with the image.

FIG. 2 is an illustration of a hardcopy print 26 of an information record that has been captured by field unit 10. Print 26 includes an image 28 of the moving vehicle that is captured with sufficient clarity to identify the license plate 30 of the moving vehicle 17. Overlaid on the image 18 are a set of data parameters 32 that have been generated by the system. These data parameters have been divided into a series of data fields that facilitate the searching of this data in a database structure that is implemented by computer system 15 (FIG. 1). As shown in FIG. 2, the data fields include a File # that is a sequential number that identifies the image file and data parameter file associated with image 28 and data parameters 32. The File # illustrated in FIG. 2 is File #25. The other data fields include the Speed Limit for the location, which is entered by the user via keyboard 16. The user also enters the Location data field which identifies the location of the field unit 10 when the image is captured. The operator also enters his or her name under the Operator data field. As shown in FIG. 2, "Chuck" has entered a speed limit of "30 mph" at the "Peoria" location.

FIG. 2 also illustrates three data parameters 32 that are automatically recorded by the field unit 10. The Time and Date data parameters are automatically recorded by the field unit 10 in the information field illustrated in print 26 by virtue of an internal clock (not shown) that is included in computer system 15 (FIG. 1). Similarly, data relating to a Camera ID (Cam ID) associated with imaging detector unit 11 can either be automatically recorded in the field computer system 12 as part of the information field, or entered by the operator through keypad 16. The imaging/detector unit 11 produces data that is communicated to computer system 15 (FIG. 1) relating to the speed and range of the moving vehicle 17. This data is stored in separate Speed and Range data files that are included in data parameters 32 and recorded with the remaining data parameters 32 over image 28 of the information record that is shown in print 26. The underlying image is not destroyed and can later be retrieved if necessary.

The information record illustrated in print 26 of FIG. 2 is a combination of a bit map image 28 that comprises a matrix of 8 bit bytes for each pixel illustrated in image 28. This produces the image 28 of moving vehicle 17 with a 256 level grey scale that can be viewed on monitor 18, or printed in hardcopy format on thermal printer 20. In contrast, data parameters 32 are stored as alpha-numeric data with the associated data fields identified in FIG. 2. The data fields and associated data parameters are placed over the bit map image 28 at the bottom of the print 26 to provide a single information record. Since the data parameters 32 are stored as alpha-numeric data and have associated data fields, they can be searched by data field, as disclosed below.

FIG. 2 also illustrates the targeting crosshairs 33. The targeting crosshairs 33 comprise additional information that is stored as part of the overlay data that is included in RAM overlay 122, as more fully disclosed in FIG. 5. The targeting crosshairs 33 are synthetically generated by the computer system 15, and can be moved on the display image by the user of the field unit 10. Movement of the crosshairs is accomplished by control signals generated from keypad 16 that are applied to computer system 15 (FIG. 1). For example, the user may select a menu option entitled crosshair location, and upon selecting that option can move the location of the crosshairs 33 using the arrow keys on the keypad. The purpose for moving the targeting crosshairs 33 is to align the targeting crosshairs with the location of the laser beam on the image 28. As shown in FIG. 2, crosshairs 33 are centered on license plate 30 which also corresponds to the location of the laser beam (not shown) on image 28. Although the laser speed gun 38 and the video camera 40 (FIG. 3) can be aligned mechanically, it is desirable to have targeting crosshairs 33 that can pinpoint the location of the laser beam within the image 28. This can be especially helpful in assuring that the proper target has been detected when overlapping images of other vehicles appear on the information record of print 26. If the reflection of the laser beam cannot actually be seen in the image 28, the imaging/detector unit 11 can be scanned across stationary targets at the same approximate range at which the user would like to capture a moving vehicle 17. Such a stationary target may comprise a telephone pole or a stop sign. If the monitor is placed in the live video mode, range data from the laser gun will indicate when the laser beam is positioned on the stationary target. Targeting crosshairs 33 can then be moved to coincide with the image of the telephone pole on the monitor 18. Similarly, a horizontal target can be located so that the targeting crosshairs can be located in a vertical direction also.

Figure 3:
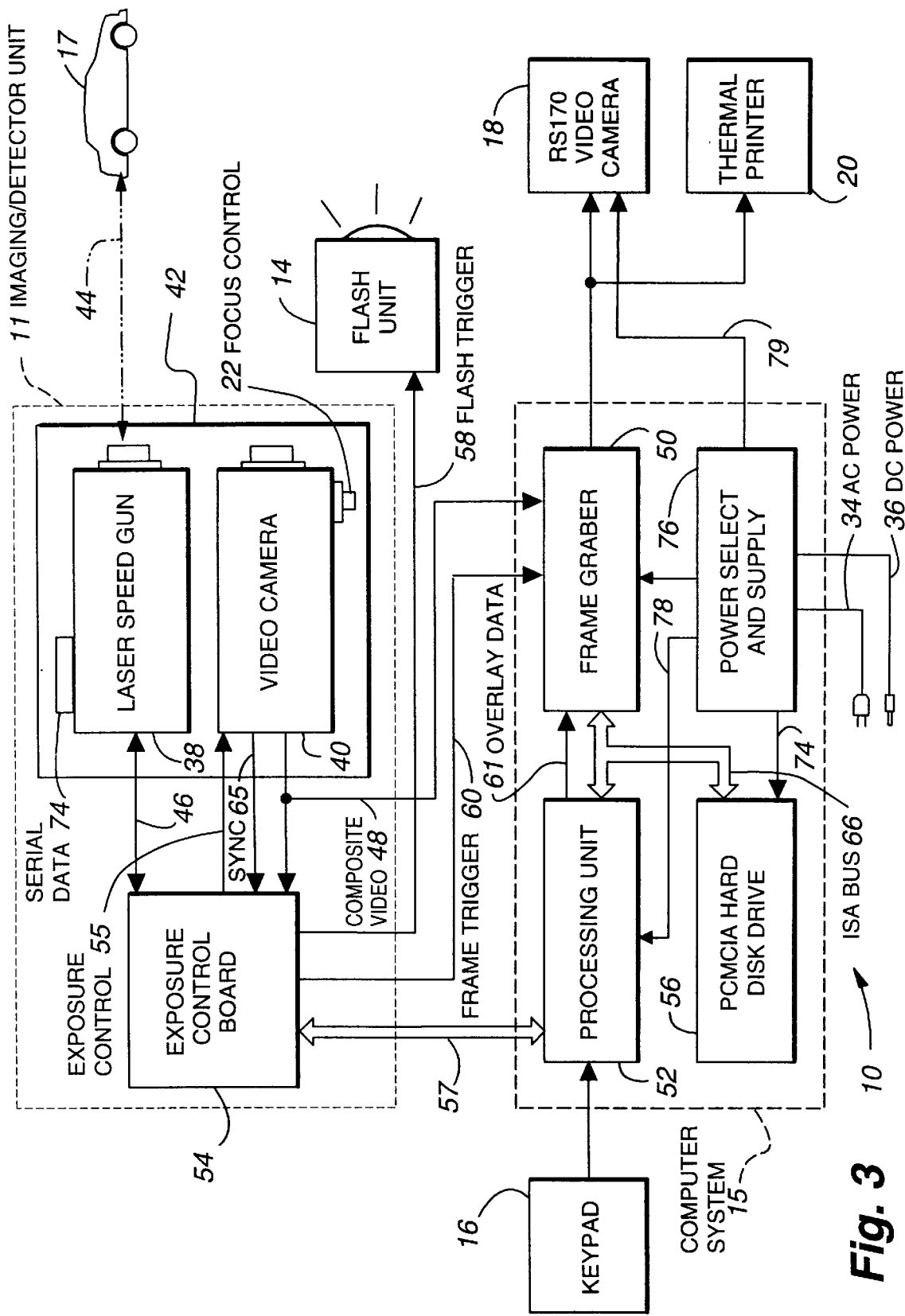
FIG. 3 is a more detailed schematic block diagram of the field unit of the present invention.

FIG. 3 is a more detailed schematic block diagram of the field unit 10 of the present invention. As shown in FIG. 3, the field unit 10 comprises the imaging detector unit 11, flash unit 14, computer system 15, keypad 16, RS170 video monitor 18, thermal printer 20, AC power connector 34 and DC power connector 36. Imaging detector unit 11 comprises an exposure control board 54, as well as a laser speed gun 38 and a video camera 40 that are mounted side by side on alignment plate 42. Mechanical alignment devices can be provided on alignment plate 42 for carefully aligning laser speed gun 38 and video camera 40 so that the laser ray 44 that is emitted by laser speed gun 38 is centered within the image recorded by video camera 40. Laser speed gun 38 and video camera 40 are mounted as closely as possible to minimize problems related to parallax when viewing image 17 at various distances. Of course, the mechanical alignment of laser gun 38 and video camera 40 can be adjusted for different distances of the imaging detector unit 11 from the moving vehicle 17.

Video camera 40 is enclosed in a waterproof container, as is laser speed gun 38. Video camera 40 is specially constructed to include a telephoto lens such as an Olympus 200 millimeter lens that is capable of imaging moving vehicle 17 with a high degree of resolution at a long distance such as 80 meters. Since the video camera 40 is enclosed in a waterproof container, an externally located focus control knob 22 is provided for mechanically changing the focal length of the 200 millimeter lens. Of course, any size lens could be used depending upon the desired distance for imaging the moving vehicle 17.

As illustrated in FIG. 3, laser speed gun 38 produces data parameters relating to the speed of the moving vehicle and the distance of the moving vehicle 17 from the imaging detector unit in the form of serial data that is communicated to computer system 15 via serial data interconnect 46. This can be done in an automatic capture mode or a manual mode by pulling trigger 47. Similarly, video camera 40 produces a composite video signal that is communicated to computer system 15 via video line 48. In addition to the composite video, video camera 40 also separately produces horizontal and vertical sync signals that are transmitted to exposure control board 54 via connector 65. The composite video signal from video camera 40 is an analog one volt peak to peak signal that is combined with the horizontal and vertical sync signals. The composite 30 video is also applied to frame grabber 50. In contrast, the serial data signal from laser speed gun 38 is an alpha-numeric data signal that is applied to processor unit 52. Video camera 40 can comprise any suitable commercially available video camera such as a Pulnix AS7 video camera, or a Sony XC75C video camera. These cameras are modified to allow external adjustment of exposure periods of the CCD array by exposure control board 54. Laser speed gun 38 is a standard laser speed gun that is commercially available from Laser Technology, Inc., 7070 S. Tucson Way, Englewood, Colo. 80112, and is also disclosed in the above referenced patent.

As also shown in FIG. 3, processing unit 52 is coupled to exposure control board 54, via connector 57. Exposure control board 54 is described in more detail in FIG. 6. Exposure control board 54 produces timing and control signals that are transmitted to processing unit 52, frame grabber 50, flash unit 14 and video camera 40. A flash trigger signal produced by exposure control board 54 is communicated to flash unit 14 over line 58, causing the flash unit 14 to emit a flash in low level light conditions to illuminate moving vehicle 17. Exposure control board 54 also emits a frame trigger signal via line 60 to frame grabber 50 to cause a single video frame to be captured. The single video frame that is captured is transmitted to PCMCIA hard disk drive 56 for storage on a PCMCIA hard disk if a speed violation has occurred. The operation of frame grabber 50 is more fully disclosed in FIG. 5. The captured image is transmitted from the frame grabber 50 to the PCMCIA hard disk drive 56 via ISA bus 66. Processing unit 52 also causes the serial data transmitted from the laser speed gun to be stored by the PCMCIA hard disk drive 56 on a PCMCIA disk. Serial data is stored in a data base file that has an identification number corresponding to an identification number for the image that is also stored on the PCMCIA hard disk. Frame grabber 50 can also display the captured image on RS170 video monitor 18 that is transmitted via video output line 62. Similarly, frame grabber 50 can transit the data of the captured image to thermal printer 20 for printing via video line 64.

The image displayed on RS170 video monitor 18 and thermal printer 20, in this instance, comprises a composite image of the 8 bit grey scale image of moving vehicle 17 together with data parameters 32 overlaid on the image, as illustrated in FIG. 2. As shown in FIG. 3, data parameters 32 are transmitted to frame grabber 50 via overlay data line 61. Interconnect 61 provides the data parameters that have been generated by the laser speed gun 38 to the frame grabber 50. ISA bus 66 provides data and address signals to frame grabber 50 and command signals to provide for proper operation of frame grabber 50. Frame grabber 50 can also be operated in a feed-through mode wherein the video signal 48 is transmitted directly through to video output 62 and subsequently to monitor 18 so that real time (live) video from video camera 40 can be viewed on RS170 video monitor 18. Keypad 16 provides a user interface via interconnect 68 to processing unit 52. Processing unit 52 can comprise any suitable commercially available computer, such as the computer system products available from Zykronix, Inc., 7248 S. Tucson Way, Englewood, Colo. 80111.

FIG. 3 also discloses a power supply 70 that receives either AC power via AC power line 34, or DC power from DC power line 36. The power select and supply circuit 70 can comprise a universal power supply that automatically recognizes whether AC or DC power is being supplied, and is capable of additionally recognizing the frequency and voltage level of the input power. These functions can also be selected manually. Power is provided from power supply 70 to processing unit 52 via power line 72, to PCMCIA hard disk drive 56 via power line 74, to frame grabber 50 via power line 76, to the processing unit 52 via power line 78 and to the monitor 18 via power line 79.

The flash unit 14 illustrated in FIG. 3 can comprise a high power adjustable flash. Typically, the flash unit 14 is located 20–25 meters from the moving vehicle 17 to provide sufficient flash elimination at night. Flash unit 14 uses a 400 joule flash bulb which is located in a parabolic reflector and disposed in a waterproof case. An infrared filter is then placed over the parabolic reflector so that a driver of the moving vehicle 17 is not blinded by the flash. The trigger signal 48 can comprise an RS485 trigger signal from the exposure control board. Depending upon the intensity level at which the flash unit 14 is set, the flash lasts from a few hundred microseconds to a few milliseconds. In comparison, video camera 40 produces a frame every 1/30 of a sec. The length of a single video frame is approximately 33 milliseconds. Hence, the length of the video frame is 1–2 orders of magnitude longer than the illumination period of the flash. Frame trigger signal 60, produced by exposure control board 54, alerts the frame grabber 50 to capture the frame during the illumination period of the flash. Exposure control board 54 has five preset exposure periods that can be selected by the user of the field unit 10 when the flash unit 14 is being employed. The user, in this manner, empirically determines the best exposure setting based on the intensity of the flash, the distance of the flash from the target, ambient light conditions, reflectivity of the target, etc. For example, if the flash duration is 5 ms, five different exposure control settings for flash operation may be provided. The first setting may be 1 ms, the second setting may be 2 ms, and so on. Hence, the exposure may be shorter than the flash period to obtain the proper exposure.

Figure 4:
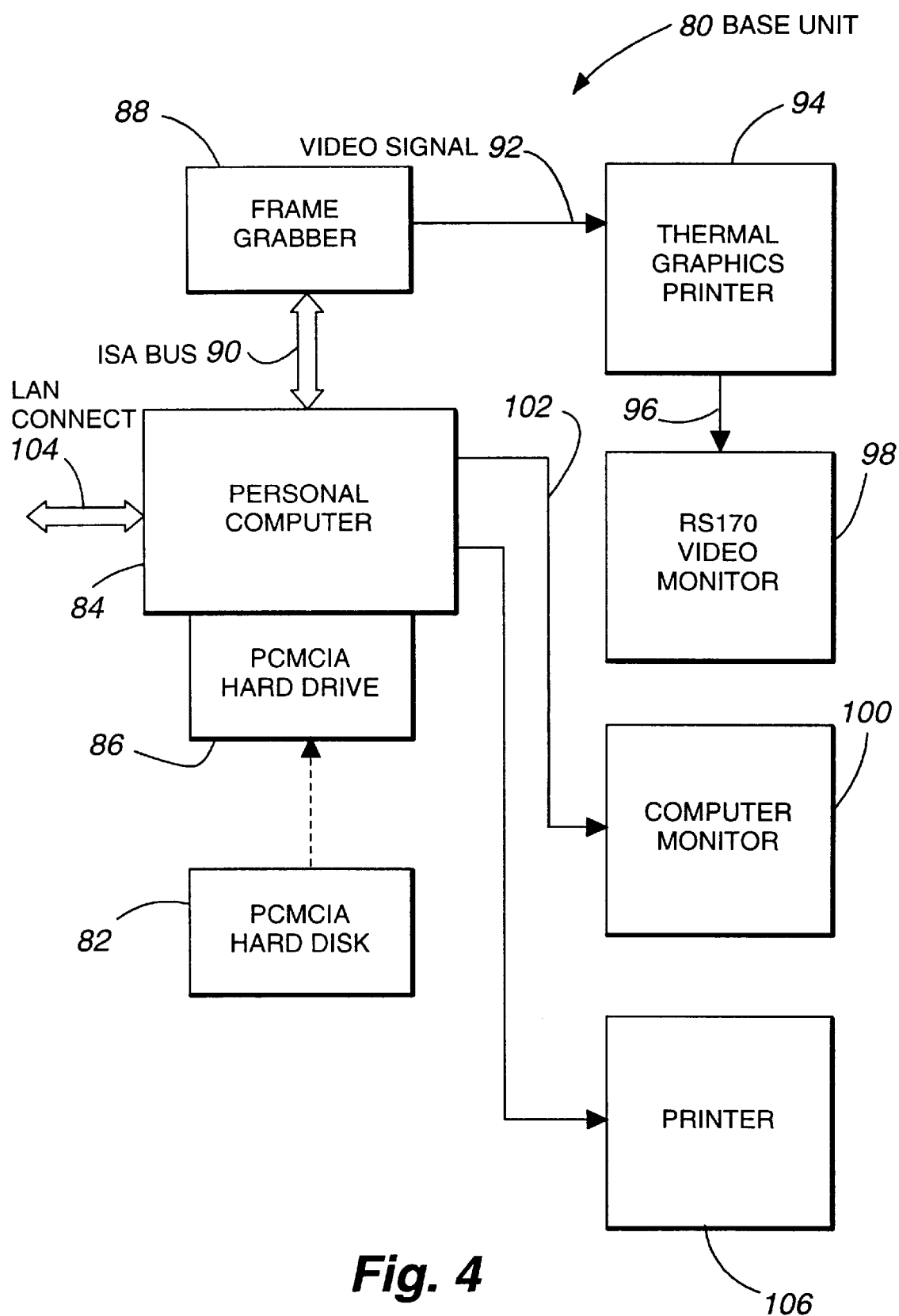
FIG. 4 is a schematic block diagram of the base unit of the present invention.

FIG. 4 is a schematic block diagram of a base unit 80. Base unit 80 can be an office based system that is configured to receive the PCMCIA hard disk that was recorded by PCMCIA hard disk drive 56. The PCMCIA hard disk 82 comprises a standard, commercially available, removable PCMCIA hard disk that is placed within the PCMCIA hard disk drive 56. The PCMCIA disk drive 56 records the information records on the removable PCMCIA hard disk 82. The PCMCIA hard disk 82 is capable of storing up to 1,000 information records on 130 M Bytes of storage. It can then be removed and transported to the base unit 80 for processing. In this manner, the expensive field unit 10 can remain free to generate information records of speeders, while the base unit 80 can be used in the office to review, retrieve and print information records. Of course, field unit 10 is capable of generating the prints 26 of the information records via thermal printer 20, illustrated in FIG. 3, as well as allowing the operator to view the information records, or live video via RS170 video monitor 18. The advantage of the base unit 80 is that it is less expensive than the field unit 10 since it uses a standard personal computer 84 having a PCMCIA hard drive 86 that is built in to the computer 84. As shown in FIG. 4, the personal computer 84 is modified to receive a frame grabber board 88 which is connected into the back plane of personal computer 84 to provide an interconnection between personal computer 84 and frame grabber 88 via ISA bus 90. The captured images stored on PCMCIA hard disk 82 are read by the PCMCIA hard disk drive 86 and transmitted via the ISA bus 90 to the frame grabber 88 which converts the 8 bit digital bit map of the image and the attached data parameters into a video signal that is transmitted to thermal graphics printer 94 via video line 92. This video signal is also transmitted to RS170 video monitor 98 via video line 96. Computer monitor 100 comprises a standard computer monitor that is connected to personal computer 84 via interconnect 102. Computer monitor 100 displays information generated by the personal computer 84 relating to the operation of the personal computer 84 in a standard manner. Of course, personal computer 84 includes an input device such as a keyboard that is not shown.

As shown in FIG. 4, personal computer 84 receives the stored data containing the information records from the PCMCIA hard disk 82. The PCMCIA hard disk drive 86, as well as the PCMCIA hard disk drive 56, are standard PCMCIA drives. For example, such drives can be obtained from Simple Technology Inc. of Santa Ana, Calif.

Both the personal computer 84 of base unit 80 and processing unit 52 are configured with a data base structure that provides searching and sorting functions for data parameters 32. Referring to FIG. 3, processing unit 52 configures the PCMCIA hard disk 82 (FIG. 4) with two subdirectories. For example, these directories may be referred to as DBASE and IMAGES. The DBASE directory is used to store the data parameters that comprise the serial data that are received from the laser speed gun 38 via interconnect 46. The IMAGES directory is used to store the bit mapped image information generated by the frame grabber 50 from the video signal 48. The DBASE directory is a database file which may have a series of data fields corresponding to the fields shown in FIG. 2. The database structure of the present invention can be generated using any standard database library such as Code Base 5.1 available from Sequiter Software Inc., P.O. Box 575, New Market, N.H. 03857-0575. The database comprises the collection of the data parameters 32 which are organized in a logical manner. Each set of data parameters 32 for a single information record comprises a single record, such as illustrated in FIG. 2, that is organized into database fields such as file number, speed, range, speed limit, location, operator, etc. The database structure allows the records to be retrieved by data field, and filters can be used in association with the data fields to retrieve a subset of available information records. For example, a user may wish to retrieve information records based upon the operator data field, and may wish to use a filter so that information records are only retrieved that indicate that Chuck is the operator. Similarly, the user may wish to sort the information records by the speed data field, and use a filter so that only records indicating speeds of greater than 50 miles an hour are retrieved.

Flags may also be used as part of the database to allow a user to sequentially access each information record and generate a flag if the user considers the information record to be useful. For example, the base unit 80 (FIG. 4) may be used to sequentially review each information record contained on the PCMCIA hard disk 82 to determine if the image 28 (FIG. 2) contains sufficient information, such as a clear image of the license plate 30 of the moving vehicle 17, and that there is a sufficient breach of the posted speed limit to warrant the issuance of a citation. In such case, the user of the base unit 80 can then flag the information record. After reviewing each of the records, the database provides for a command that causes each of the flagged information records to be printed in the thermal graphics printer 94. In this manner, the user of the base unit 80 is not constrained by the time it takes to print each of the information records on thermal graphics printer 94.

A records structure for the database may be formatted as follows:

| IDENT STRING | DATA TYPE | SIZE IN BYTES | DESCRIPTION |
| --- | --- | --- | --- |
| IMAGE_FN | String | 8 | Image File Name, I0000001, I0000002, Etc. |
| SPEED | String | 6 | Vehicle Capture Speed. 0–320 KPH max. in whole numbers. All capture values are converted to positive values for sorting. |
| RANGE | String | 6 | Vehicle Capture Range. 0–1000 M max. in .1 M resolution. (All positive) |
| SPEED_LIM | String | 6 | Posted Speed Limit in KPH. |
| LOCATION | String | 13 | Location of Capture, user entered from keypad. |
| OPERATOR | String | 13 | System Operator, user entered from keypad. |
| CAPT_TIME | String | 10 | Time of Photo Capture in HH.MM.SS AM/PM format. |
| CAPT_DATE | String | 8 | Date of Photo Capture in julian format. This entry is converted back to MM/DD/YYYY format before displaying or printing on the field system. |
| SENSOR_ID | String | 13 | Camera/Laser head ID requested from the camera control processor board. |

-continued

| IDENT STRING | DATA TYPE | SIZE IN BYTES | DESCRIPTION |
|---|---|---|---|
| CROSSHR_X | Number | 3 | X position of the aiming crosshair. (In pixels with the 0,0 position in the upper left corner) |
| CROSSHR_Y | Number | 3 | X position of the aiming crosshair. (In pixels with the 0,0 position in the upper left corner). |
| UNITS | String | 1 | Units<br>I = Imperial, M = Metric. (Rev. 2.0 only captures in Metric) |
| VID_FORMAT | String | 1 | Camera Video Format input when this image was captured. N = NTSC, Y = CCIR. (Images are always 512 × 512 after capture regardless of which format is used). |
| FRAME_FMT | Logical | 1 | Stored image format.<br>N = Alternate line format. i.e. only the alternate odd lines of the frame are saved.<br>Y = The Full Frame/all lines are saved. Rev. 2.0 only uses the alternate line format. |
| PRINT_TAG | Logical | 1 | Image in Print Queue.<br>T = Queued to print,<br>F = Not Queued. (Only used for queuing while auto printing is on during the capture operation). |
| USER_TAG | Logical | 1 | User selectable Image Tag.<br>T = Tag Set, F = Tag Cleared. Used to control selected viewing, printing and deleting of images. |

In operation, the sorting of information by data field is accomplished by generating a secondary file, or sort file, that utilizes pointers in the records to the main database file. In this manner, data can be retrieved, by field, through the secondary file pointers. The database structure, of course, resides both in the processing unit 52 of field unit 10 and the personal computer 84 of base unit 80.

FIG. 4 also illustrates an additional method of operation of the base unit 80. Personal computer 84 can be connected via a local area network (LAN) connection 104 to other databases that contain the registration information for automobiles or other information. Personal computer 84 can be configured in a standard manner to search a registration database for each license identified in an information record. For example, while a user of base unit 80 is sequentially reviewing each of the information records that is stored on PCMCIA hard disk 82, the user may enter the number of the license plate 30 that the user views on the information record to obtain the name and address of the registered owner of the vehicle. This information can then be retrieved by personal computer 84, and used to automatically print a citation and an envelope that is addressed to the registered owner using printer 106.

Figure 5:
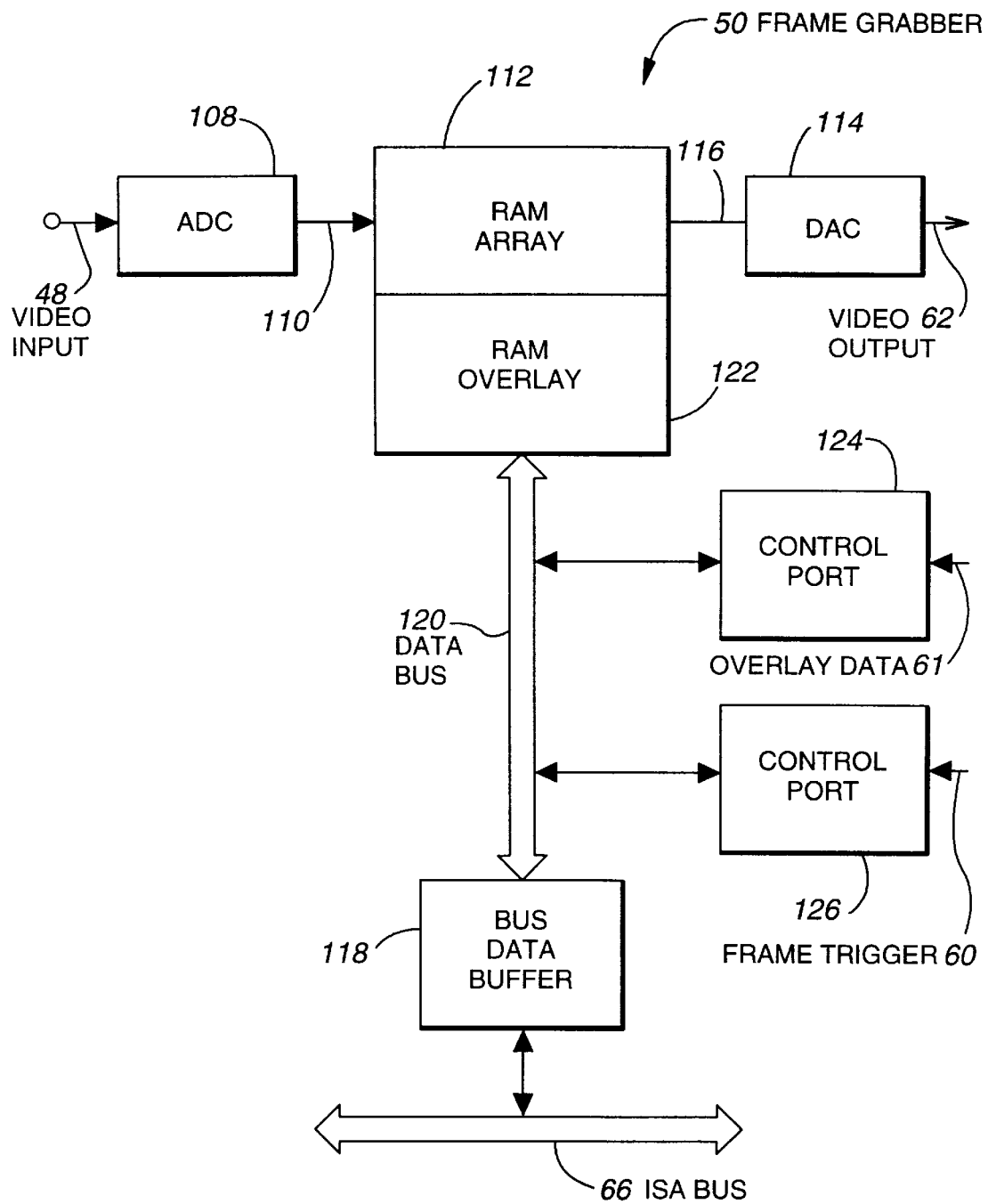
FIG. 5 is a schematic block diagram illustrating the frame grabber device of the present invention.

FIG. 5 is a schematic block diagram illustrating the frame grabber 50. Commercially available frame grabbers can be employed such as the CX100 Frame Grabber available from ImageNation, P.O. Box 276, Beaverton, Oreg. 97075. In operation, the frame grabber 50 receives the video signal from video input 48 and applies the video signal to analog to digital converter (ADC) 108. The analog to digital converter 108 generates an 8 bit byte that is representative of the gray scale of the video signal for each pixel of the video signal. These series of 8 bit bytes are transmitted via line 110 to a RAM Array 112 which stores the plurality of bytes in a matrix fashion in a manner that corresponds to the image 28 (FIG. 2). In this manner, 256 levels of gray scale are stored for each pixel that comprises the video signal. Typically, a video signal may represent a 512×512 array format of pixels that are stored in RAM array 112. RAM array 112 may comprise a dual port RAM array that is capable of both reading and writing information simultaneously. RAM Array 112 is connected to digital to analog converter (DAC) 114 via interconnect 116. Digital to analog converter 114 generates an analog video signal based on the 256 gray scale level digital signal for each pixel. The output of the digital to analog converter 114 is connected to output connector 62, which, in turn, can be coupled to a video monitor or thermal printer.

As also illustrated in FIG. 5, the frame grabber is connected to the ISA bus 66 of the processing unit 52 (FIG. 3). A data buffer 118 is coupled between the ISA bus 66 and the internal data bus 120 of the frame grabber 50. Control and address signals are provided via the ISA bus 66 that are generated by the processing unit 52, to control the operation of frame grabber 50.

FIG. 5 also illustrates the manner in which overlay data from the processing unit 52 and a trigger signal from exposure board 54 are coupled to frame grabber 50. As shown in FIG. 5, the data parameters 32 are transmitted via connector 61 to a control port 124 that is coupled to the frame grabber internal data bus 120. The data parameters 32 are stored in RAM overlay 122 which comprises a separate storage area from RAM array 112. Control Port 126 couples a trigger signal from exposure control board 54 via connector 60 to data bus 120. The trigger signal causes RAM array 112 to capture an image of the digitized video signal. The captured image stored in RAM array 112 is given an image file number that corresponds to an image file number for the data parameters stored for that image in RAM overlay 122. Control signals generated by processing unit 52 (FIG. 3) can then be generated and transmitted to RAM array 112 and RAM overlay 122 via ISA bus 66 to cause the image information stored in RAM array 112 to be read from the RAM array 112 together with data parameters 32 stored in Ram overlay 122. The combined image is then transmitted via connector 116 to the digital to analog circuit 114, that comprises a composite image containing the stored image of the vehicle together with the data parameters that are placed over the stored image. This composite image comprises the video output 62 that can be displayed on the video monitor 18 of the field unit, or video monitor 98 of the base unit (FIG. 4). Similarly, the image may be printed on thermal printer 20 of field unit 10 (FIG. 3) or thermal printer 94 of base unit 80 (FIG. 4). Since the data parameters are stored in a separate RAM overlay 122, the composite image does not erase the underlying image.

Figure 6:
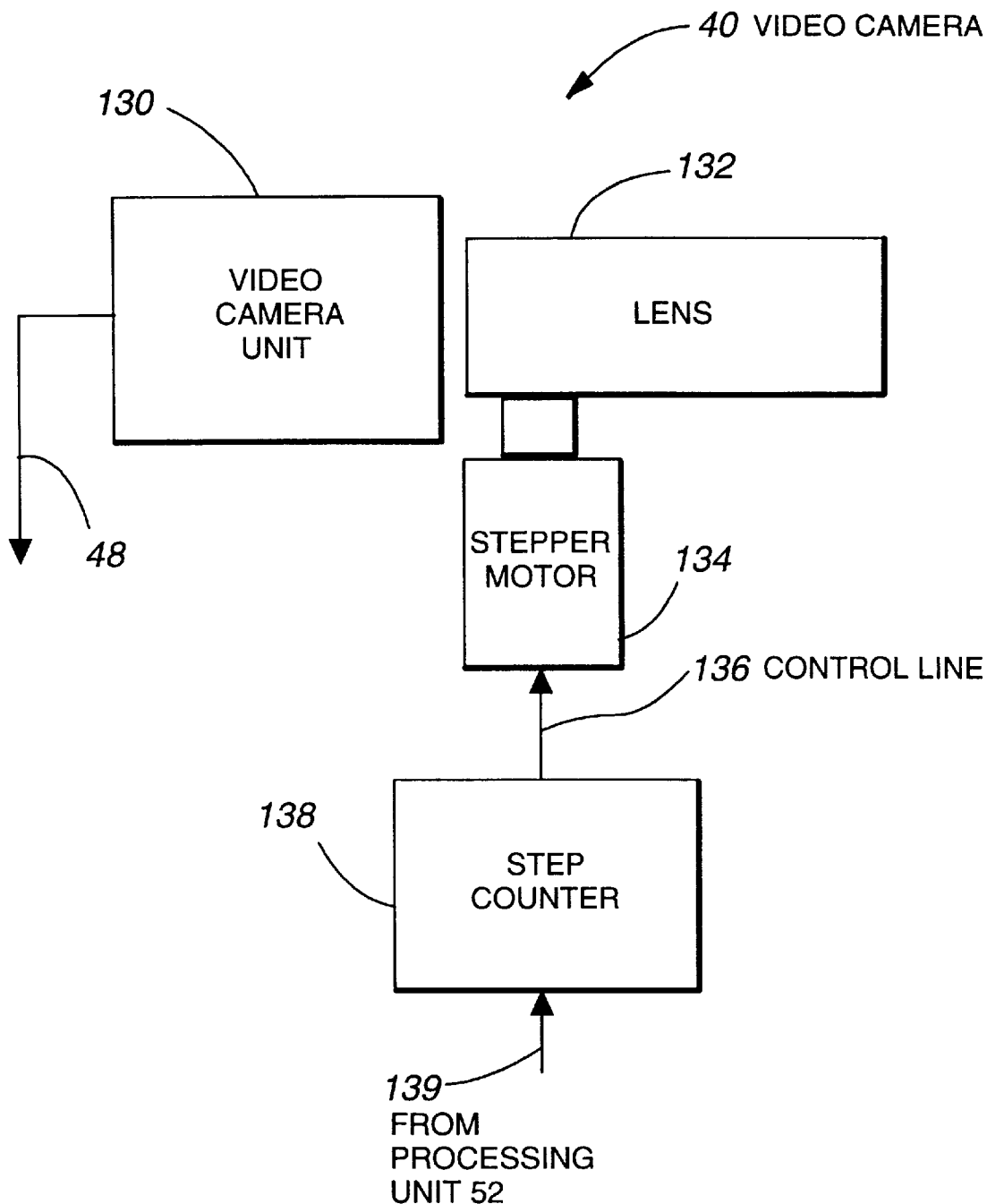
FIG. 6 is a schematic block diagram of an automatic focusing system.

FIG. 6 is a schematic block diagram illustrating an optional method for focusing the video camera 40. Video camera 40 includes a video camera unit 130 which is optically aligned with a telephoto lens 132. As mentioned above, lens 132 can comprise a 200 millimeter Olympus telephoto lens or any suitable alternative. The focusing mechanism of lens 132 is mechanically coupled to stepper motor 134 which can adjust the focus of lens 132 in incremental steps. Stepper motor 134 is controlled by control line 136 that is coupled to step counter 138. Step counter 138 receives a count signal from processing unit 52 representative of the distance lens 132 should be moved for proper focus. In the automatic mode of operation, processing unit 52 causes the lens 132 to be driven to an infinite focus position. Processing unit 52 has values stored in a look-up table that relate to the number of steps required to move stepper motor 134 to cause lens 132 to focus at any desired distance. When laser speed gun 38 is set for automatic operation, as explained below, the range data, produced by laser speed gun 38, is transmitted over serial data line 46 (FIG. 3) to processing unit 52. Processing unit 52 uses the distance information (range data) to access the look-up table and thereby determine the number of steps required to drive lens 132 via stepper motor 134 to focus at the capture range. The data from the look-up table is transmitted to step counter 138 which produces an output on control line 136 corresponding to the number of steps that the stepper motor 134 should move to drive the lens 132 to the proper focal distance. Of course, the automatic focusing system of FIG. 6 can be operated in a non-automatic mode by producing drive signals using the arrow keys (not shown) of keypad 16. In this manner, the user, by viewing the image through video monitor 18, or targeting monitor 21, can focus the image of the moving target at the desired distance.

The automatic focusing system of FIG. 6 can also be operated in a full focus tracking mode. In the full focus tracking mode, the automatic focusing system of FIG. 6 tracks the focus of a vehicle from a preset maximum focal distance to a preset minimum focal distance. In operation, range data from the laser speed gun is continuously transmitted to processing unit 52. Whenever the vehicle enters a capture window, that is defined by the preset maximum focal distance and the preset minimum focal distance, control signals from the look-up table in processing unit 52 drive the step counter 138 via connector 139 in real time. Updated range data from laser speed gun 38 causes the stepper motor 134 to track the focus of the vehicle throughout the full range of the capture window. Of course, a preset capture range can be set within the capture window so that lens 132 maintains the vehicle in focus until the image is captured at the preset capture range. The preset maximum focal distance is normally set in the factory and corresponds to the maximum range that a vehicle can reasonably be imaged to obtain the necessary image data, such as a discernable, readable image of the license plate so that the vehicle can be properly identified. Similarly, the preset minimum focal distance is also set in the factory and corresponds to the minimum range that a vehicle can be imaged using a particular telephoto lens 132 such that a full image of the vehicle, including the license plate fits within the image frame of the information record 26. This means that the entire vehicle should be visible within the image frame and the license plate should appear in a position so that it is not covered by the parameter data.

Figure 7:
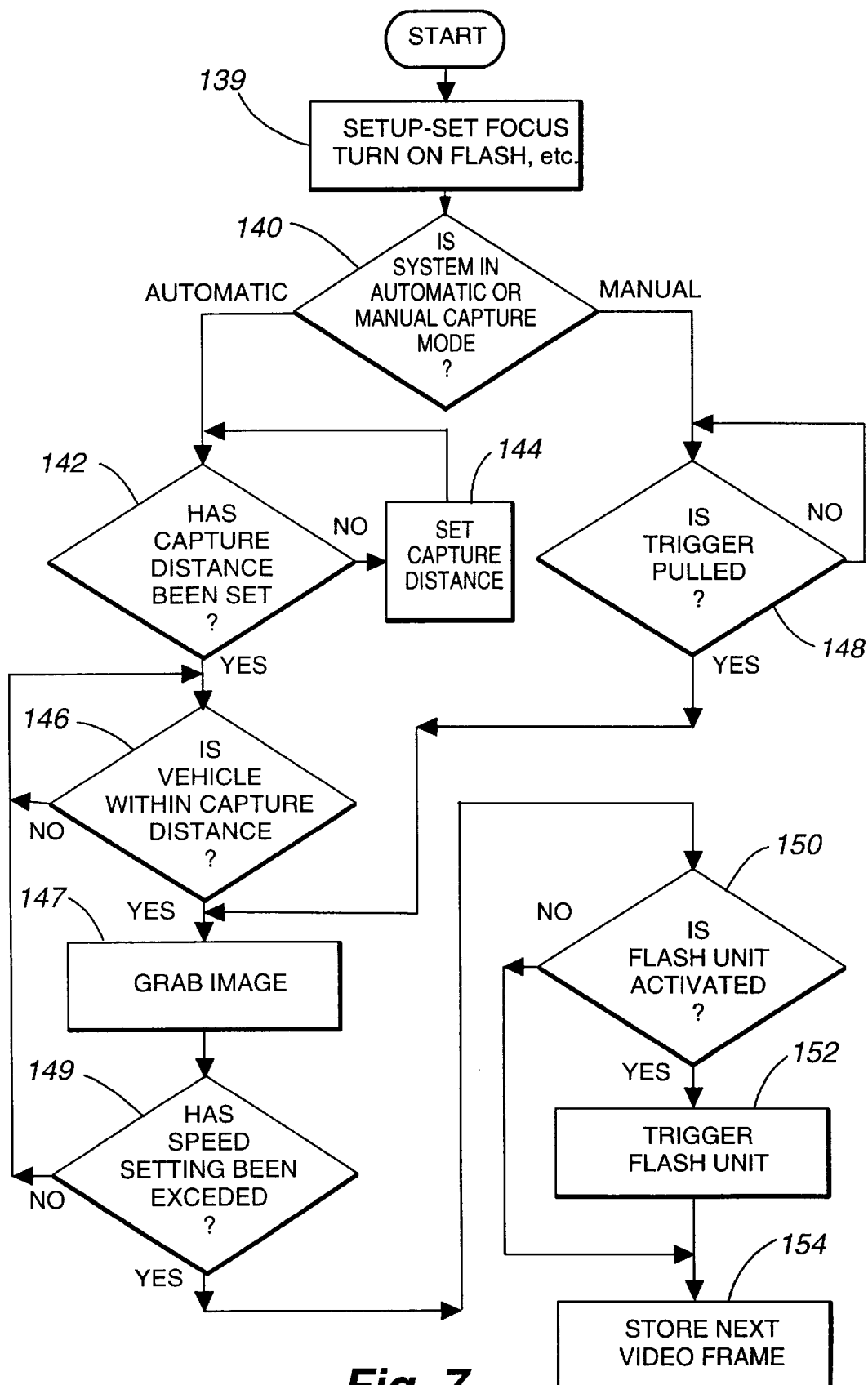
FIG. 7 is a flow chart illustrating the manner in which the field unit of the present invention is operated in automatic and manual mode.

FIG. 7 is a schematic flow diagram that illustrates the manner in which field unit 10 operates in either an automatic or manual capture mode and the manner in which the flash unit 14 may or may not be triggered. As shown in FIG. 7, the system is initially setup at step 139. The focus can be set, the flash unit can be activated, etc. at this point. This can be done manually, or the system can be designed for automatic operation. For example, the system can be designed to automatically set the proper focal distance for ir operation when the flash unit is activated. Next, the system determines, at step 140, whether the user has set the field unit 10 in automatic or manual capture mode. In automatic mode, the user sets a predetermined capture distance for capturing the image of the moving target 17. A predetermined capture window of a few meters is preset within the field unit 10 at the factory. If the system determines that the user has set the system in automatic capture mode, the system then determines whether a capture distance has been set at step 142. The capture distance can be set by aiming the imaging/detector unit 11 at a target, either stationary or moving, that is located at the desired capture distance. For example, the user may wish to image a certain portion of a road, and when a moving vehicle 17 is in that portion of the road, the user can pull trigger 47 (FIG. 3) on the laser speed gun 38 which produces a distance parameter that is transmitted to processing unit 52. The distance data is then used to set the capture distance when the system has been set in automatic capture mode. Alternatively, the user can set the capture distance manually at step 144 by entering a distance into the system using keypad 16. Once the capture distance has been set, the system then runs in automatic mode and generates data parameters from laser speed gun 38 that are transmitted to processing unit 52. At step 146, the system compares the detected distance of moving vehicle 17 with the capture distance until the vehicle enters the capture distance window. On the other hand, when the system is set in manual mode, the system determines if trigger 47 has been pulled on the laser speed gun 38 at step 148. If the trigger has been pulled in manual mode or if the vehicle has moved into the capture distance window during automatic capture mode, the system then captures an image of the moving vehicle at step 147. At step 149 the system determines whether the speed setting that has been entered into the system has been exceeded. If not, the system monitors for another vehicle. If the speed setting has been exceeded, it determines whether the flash unit has been activated at step 150. If the flash unit has been activated, the system generates a trigger signal at step 152. If the flash has been triggered at step 152, or if the flash unit has not been activated, the system then generates a signal to store the next video frame at step 154.

Figure 8:
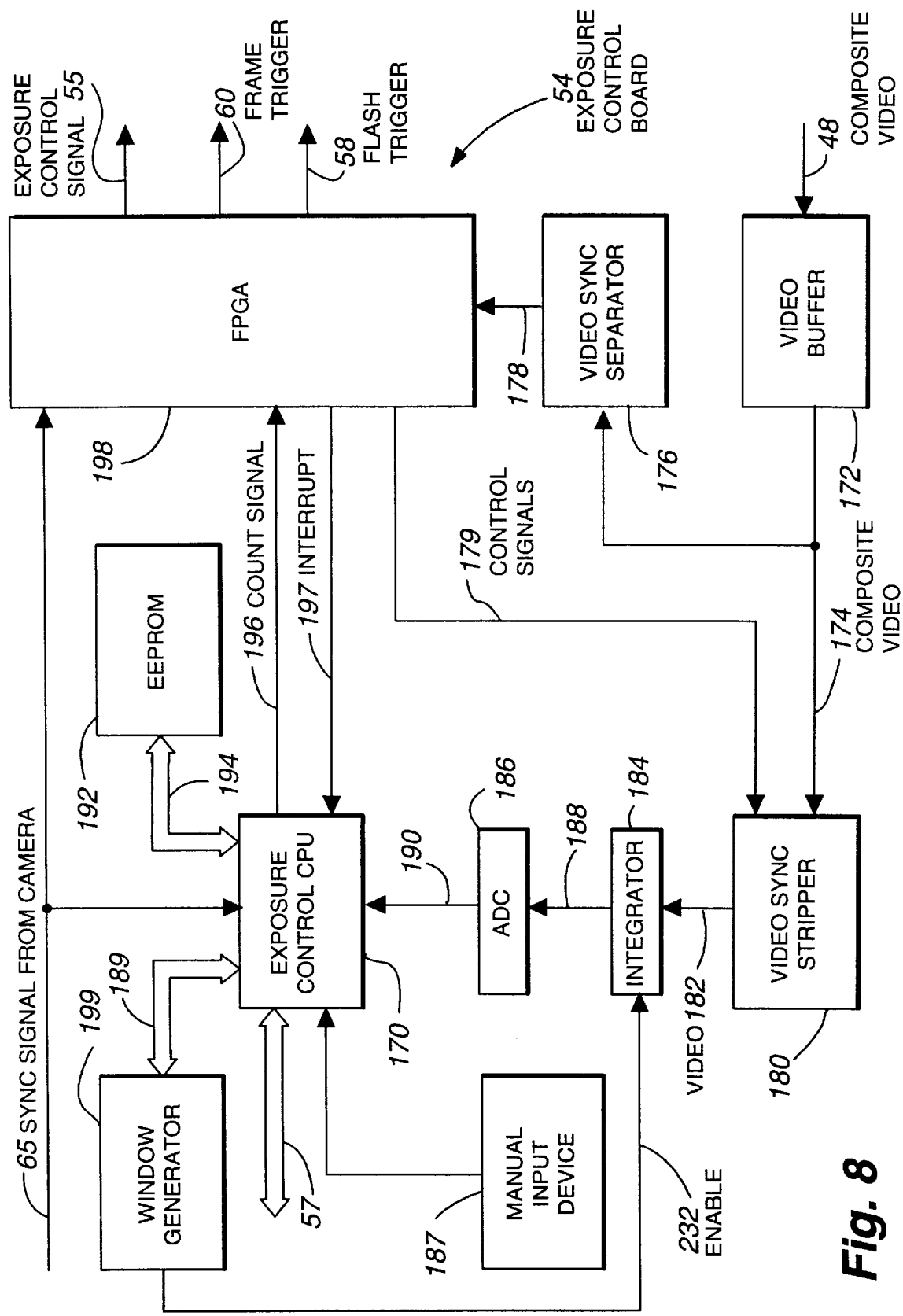
FIG. 8 is schematic block diagram of the exposure control board.

FIG. 8 is a schematic block diagram illustrating the exposure control board 54. Exposure control board 54 includes an exposure control central processing unit 170 that calculates the exposure period for the CCD array of video camera 40. Exposure control CPU 170 is coupled to the processing unit 52 (FIG. 3) of computer system 15 via connector 57, that communicates timing and control signals between each of these units. Exposure control CPU 170 is also coupled to an optional window generator 199, that is more fully disclosed in FIG. 9, via connector 189. Composite video on connector 48 (shown in both FIG. 8 and in FIG. 3) from video camera 140 is applied to a video buffer 172. Video buffer 172 couples the composite video signal 174 to a video sync separator 176 and video sync stripper 180. The video sync separator 176 provides video sync signals to FPGA 198 via connector 178. FPGA 198 processes the sync signals and produces control signals 179 that are derived from the sync signals 178. Control signals 179 function to control the operation of video sync stripper 180. Video sync stripper 180 uses the control signals 179 to remove the video sync signals from the composite video 174 to produce a 1 volt peak to peak video signal on output 182 that does not include the sync signals. The video signal 182 is then applied to integrator 184 that functions to integrate the video signal. The integrated video signal is a representation of the integrated value of the white level of the video signal for the portion of the image that is included within an exposure control window that is described below in FIG. 9. Window generator 199 generates an enable signal 232 that turns the integrator 184 on and off at various times during the scan so that only a selected portion of the video signal, that corresponds to the window, is actually integrated by integrator 184, as more fully disclosed in FIG. 9. Manual input device 187 comprises a device for generating input signals that relate to the location, size and shape of the exposure control window, as more fully disclosed below.

The integrated video signal is then supplied to analog to digital converter 186 via connector 188, as shown in FIG. 8. The digitized signal, that is representative of the integrated value of the video signal within the exposure control window, is applied to the exposure control CPU 170 via connector 190. This may comprise a COM port on the exposure control CPU 170. The exposure control CPU compares sequential values of the integrated and digitized signal 190 that is representative of the integrated value of the video signal in the exposure control window. The value of this signal, together with the rate of change of sequential signals, is used to generate an address signal that is used to address a look-up table stored in EEPROM 192 via connector 194. Look-up table 192 allows the system to store values that can be scaled by the user to adjust the exposure. The values stored in EEPROM 192 correspond to numerical counts that are transmitted via connector 196 to field programmable gate array (FPGA) 198. FPGA 198 is configured with a series of 12 bit loadable counters that store the count signals 196 provided by exposure control CPU 170. A separate counter is provided for the exposure control, the frame trigger, and the flash trigger. The three loadable counters that are included in FPGA 198 are reset and loaded during each vertical retrace sync signal that is provided by connector 65 to exposure control CPU 170 and FPGA 198. In this manner, a new count is provided in the counters for each video frame. The counters are enabled at the beginning of the trace to start the count. When the counters have reached the stored count level, a control signal is enabled. The control signal can be used in conjunction with the vertical retrace signal to generate an exposure control signal 55 that has a programmable period corresponding to the magnitude of the count loaded into an exposure control counter. In a similar manner, the timing of the flash trigger signal 58 and frame trigger signal 60 is determined by the counters in FPGA 198. Interrupt signal 197 is generated by FPGA 198 to interrupt the Exposure control CPU 170.

Figure 9:
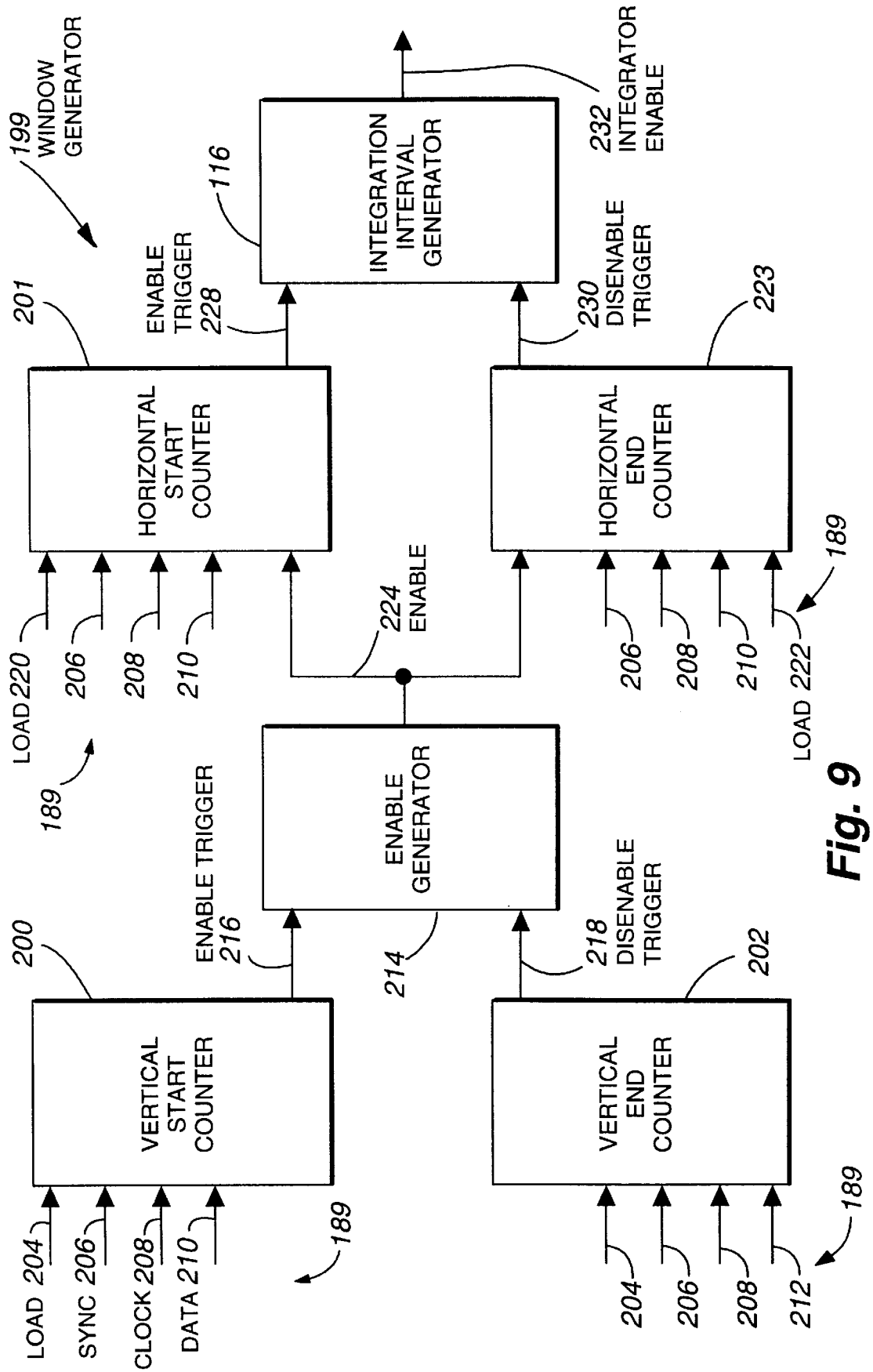
FIG. 9 is a schematic block diagram of the exposure control window circuit.

FIG. 9 is a schematic block diagram of an optional window generator that can be included on the exposure control board 54, as shown in FIG. 8. FIG. 9 discloses a device for generating an integrator enable signal 232 that can be applied to integrator 184 (FIG. 8) to enable the integrator to integrate only certain portions of the video signal 182. By turning the enable signal 232 on and off at specified times during both the horizontal and vertical scanning period of the video signal, the resultant effect is that integrator 184 can integrate a window that is a subportion of the entire image. Additionally, the window generator 199 of FIG. 9 is capable of locating the window at any desired position on the image, and generating a window having any desired horizontal or vertical size or shape.

In operation, the window generator of FIG. 9 includes a vertical start counter 200 and a vertical end counter 202 that are coupled to sync signal 206, clock signal 208 and data signal 210. These signals are received from the exposure control CPU 170 of the exposure control board, illustrated in FIG. 8, via connector 189. The exposure control CPU also produces load signal 204 that is applied to vertical start counter 200 which functions to load the data present on data line 210 into vertical start counter 200. This data comprises a count signal that is loaded into a register (not shown) of the vertical start counter that corresponds to the desired vertical position of the top of the exposure control window. In accordance with the count, an enable trigger 216 is generated and applied to enable generator 214. In a similar manner, vertical end counter 202 receives a load pulse 212 which loads a count indicative of the vertical position of the desired bottom of the exposure control window. In accordance with the count, a disenable trigger 218 is generated by vertical end counter 202 and applied to enable generator 14. Enable generator 214 then generates an enable signal 224 in response to the enable trigger 216 and disenable trigger 218. The enable signal 224 is applied to horizontal start counter 221 and horizontal end counter 223. Both the horizontal start counter 221 and horizontal end counter 223 receive the same sync signal 206, clock signal 208 and data signal 210 via connector 189. Load signal 220, that is applied to horizontal start counter 221, functions to load the appropriate data from data line 210 into a register of horizontal start counter 221 that is indicative of the desired left side horizontal starting position of the exposure control window. Horizontal start counter 221 generates an enable trigger 228 corresponding to the count loaded into the horizontal start counter 221. Similarly, horizontal end counter 223 receives a load pulse 222 to load a horizontal end count from data line 210 that is representative of the desired right side horizontal end of the exposure control window. When the count stored in horizontal end counter 223 is reached, a disenable trigger 230 is generated that is applied to integration interval generator 226. The integration interval generator 226 generates an integrator enable signal 232 in response to the enable trigger 228 and disenable trigger 230. The integrator enable signal 232, as described above, turns the integrator 184 (FIG. 8) on and off at the appropriate times so that only the desired portion of the image is integrated that corresponds to an exposure control window. The data loaded into the vertical start counter 200, the vertical end counter 202, the horizontal start counter 221 and the horizontal end counter 223 is generated by the exposure control CPU 170 (FIG. 8) and transmitted to the window generator 199 via connector 189. Exposure control CPU generates the data supplied on line 220 from other data provided by either processing unit 52, via connector 57, or from manual input device 187 (FIG. 8). If data is being provided by processing unit 52 (FIG. 3), it may be manually entered by the user via keypad 16. For example, the user may use the arrow keys to position the center of the window and then use the arrow keys to generate vertical and horizontal size signals. Additionally, the location of the window may be referenced with the targeting crosshairs 33 (FIG. 2). The reference position of the crosshairs 33 can be used by exposure control CPU 170 to generate the data signals on line 210.

The manual input device 187 (FIG. 8) can comprise any standard manual control mechanism such as a joy stick, a mouse, control arrows, or a moveable ball. Any of these manual input devices can be actually mounted on video camera 40 or provided separately. Manual input device 187 generates digital signals that are applied to exposure control CPU 170 that constitute the data signals 210 that are applied to the window generator 199 to locate the position and size of the exposure control window within the image generated by the video camera 40.

This technique of generating a moveable exposure control window having selectable sizes is applicable to any type of video camera/recorder type device including camcorder video recorders and, standard broadcast quality video cameras. For example, a moveable ball could be mounted on the side of a video camera to locate the position of the exposure control window. Furthermore, manual controls could also be provided, such as arrow buttons, for changing the height and width of the exposure control window. In this manner, the location and size of the exposure control window can be moved on the image 28 to provide the correct amount of exposure for any portion of the image 28 that is desired.

The present invention therefore provides many advantages over prior art systems including the ability to maximize the use of the digital data parameters that are stored in a database that can be searched and sorted by parameter field, the ability to flag images for later printing, the use of a movable exposure control window, use of a wide dynamic range exposure control system, the ability to target a moving vehicle using a magnified monitor image, the ability to identify the location of the laser beam within the image using targeting crosshairs, the ability to run in either automatic or manual capture mode, the ability to capture data on a high speed, high volume data storage device that can be transported to a base unit for processing and the ability to target different portions of the image for automatic exposure control.

Obviously many modifications and variations of the present invention are possible in light of the above teachings. For example, any of these concepts can be employed in standard video cameras such as camcorders or broadcast quality video cameras to provide better images. It is therefore to be understood that within the scope of the appended claims the invention may practiced otherwise than as specifically described.

What is claimed is:

1. A system for storing an image of a moving vehicle and associated data parameters relating to said image, said moving vehicle located at a distance from said system, comprising:

an image detector that produces an image signal of said moving vehicle;

a parameter detector that measures said distance of said moving vehicle and generates said associated data parameters relating to said image, said measured distance being one of said associated data parameters;

a controller that triggers a frame capture event by said image detector if said measured distance satisfies a predetermined distance condition stored within said system; and a database processor coupled to said image detector and said parameter detector that stores said image signal and said associated data parameters and provides predetermined data parameter fields that can be searched by said database processor.

2. The system of claim 1 further comprising:

a removable storage device capable of storing a plurality of image signals and associated data parameters that can be processed separately from said system.

3. The system of claim 1 further comprising:

an exposure control device coupled to said image detector that monitors ambient light levels of said moving vehicle and adjusts the exposure period of said image detector based upon said ambient light levels, and provides at least one preset exposure for flash illumination of said moving vehicle.

4. The system of claim 1 further comprising:

an image generator that is capable of generating said image of said moving vehicle and said associated data parameters relating to said image.

5. A system including a field unit and a base unit for recording an image of a moving vehicle and a set of parameters associated with said image, said moving vehicle moving at a speed relative to said system, comprising:

an image detector disposed in said field unit that produces an image signal representative of said image of said moving vehicle;

a parameter detector disposed in said field unit that detects said speed of said moving vehicle and generates a parameter signal representative of said parameters associated with said image;

a first storage device disposed in said field unit having a removable storage medium that is capable of storing a plurality of said image signals and said parameters associated with said image, each set of stored parameters associated with said image including a reference indicator visible when said image is displayed identifying the alignment of said parameter detector within said image; and a second storage device disposed in said base unit that is capable of reading said removable storage medium.

6. The system of claim 5 further comprising:

a manual entry device in said field unit that generates an additional parameter signal that is representative of manually entered parameters.

7. The system of claim 5 wherein said parameter signal is representative of the speed and range of said moving vehicle, and the time and date of said recording of said moving vehicle.

8. The system of claim 5 further comprising:

an image generator that is capable of generating said image of said moving vehicle and said parameters associated with said image.

9. A system for displaying an image of a moving vehicle and parameters associated with said image comprising:

an image detector that produces an image signal representative of said image of said moving vehicle;

an exposure control device coupled to said image detector that monitors ambient light levels over a portion of said image of said moving vehicle and adjusts the exposure period of said image detector based on said ambient light levels, said portion having adjustable dimensions and being movable within said image;

a parameter detector that generates a parameter signal representative of said parameters associated with said image; and an image generator that generates said image of said moving vehicle together with said parameters associated with said image.

10. A method of storing and retrieving images of moving vehicles and associated data parameters relating to said images comprising the steps of:

generating image signals representative of said images of said moving vehicles;

generating parameter signals representative of parameters associated with said image signals;

generating predetermined database parameter fields corresponding to said parameter signals, at least one of said predetermined database fields being a settable flag used for selective retrieval of said image signals and said parameter signals; and retrieving said image signals and said parameter signals in accordance with said flags.

11. A method of automatically acquiring image information and data parameters of a moving vehicle in a speed detection and imaging system comprising the steps of:

measuring the distance and speed of said moving vehicle relative to said system;

setting a predetermined capture distance condition in said speed detection and imaging system;

comparing said measured distance with said predetermined capture distance condition;

generating a trigger signal, responsive to said comparing step, if said measured distance satisfies said predetermined capture distance condition;

capturing an image of said moving vehicle and data parameters relating to the speed of said moving vehicle, responsive to said trigger signal;

storing said image and said data parameters in a searchable database.

12. The method of claim 11 further including the step of triggering an illumination event of said moving vehicle when said speed of said moving vehicle exceeds a predetermined speed.

13. In a system for viewing and recording an image of a moving vehicle, said system including a field unit having a laser speed gun and a viewer for producing and viewing said image including said moving vehicle, a method of aligning a laser beam position reference indicator on said image with a laser beam produced by said laser speed gun so that said reference indicator on said image corresponds to a position of said laser beam on said moving vehicle in said image comprising the steps of:

aiming said speed gun at a target at a distance;

generating an image in the viewer which includes said target;

generating a visible reference indicator on said image in said viewer; and moving said visible reference indicator on said image in the viewer so as to align said reference indicator with said target in said image while said speed gun is aimed at said target.

14. The method according to claim 13 wherein said visible reference indicator is a pair of computer generated cross hairs.

15. The method according to claim 13 wherein said step of aiming the laser speed gun at a target at a distance comprises the steps of selecting a target at a target distance in a field of view having a distance greater than said target distance;

panning said laser speed gun across said field of view until said speed gun indicates said distance to said target; and stopping said pan of said laser speed gun when said speed gun indicates said target distance.

16. A system for storing and retrieving images and associated data parameters of a moving vehicle in the form of an information record comprising:

an image detector that produces an image signal representative of said image of said moving vehicle;

a parameter detector that generates said data parameters associated with said image of said moving vehicle;

a digital storage system that stores said data parameters and associated images to form said information records; and a database processor that provides database fields associated with data parameters, at least one of the database fields being representative of a manually settable flag for retrieving selected information records.

17. A system for generating an information record that includes an image of a moving vehicle and parameters associated with said image, said moving vehicle being located at a measured distance from said system, comprising:

a distance measuring device that continuously determines said measured distance between said distance measuring device and said moving vehicle;

an electronic camera that generates an image signal representative of said image of said moving vehicle;

a frame grabber for capturing said image signal in response to a frame trigger signal;

a flash illuminator that generates a flash illumination at a predetermined time in response to a flash trigger, said flash illuminator being sufficiently bright to illuminate said moving vehicle at night and in low level light conditions; and an exposure controller that generates said frame trigger and said flash trigger at predetermined times to ensure that said frame grabber captures said image during said flash illumination, said frame trigger being generated when said measured distance of said moving vehicle enters a range of predetermined distance values set and stored in said system.

18. The system of claim 17 wherein said exposure controller further comprises:

an exposure generator that generates an exposure control signal that can be one of a number of preset exposure values that control the exposure period of said electronic camera.

19. A system for storing an image of a moving vehicle and associated data parameters relating to said image comprising:

an image detector having an electronic shuttering capability that produces an image signal of said moving vehicle, a parameter detector that generates said associated data parameters relating to said image; and a database processor coupled to said image detector and said parameter detector that stores said image signal and said associated data parameters and provides predetermined data parameter fields that can be searched by said database processor.

20. A system for storing an image of a moving vehicle and associated data parameters relating to said image comprising:

an image detector that produces an image signal of said moving vehicle;

a parameter detector employing a laser that generates said associated data parameters relating to said image; and a database processor coupled to said image detector and said parameter detector that stores said image signal and said associated data parameters and provides predetermined data parameter fields that can be searched by said database processor.

21. A system for storing an image of a moving vehicle and associated data parameters relating to said image, said moving vehicle moving at a speed relative to said system and being located at a distance from said system, comprising:

a video camera that produces an image signal of said moving vehicle;

a parameter detector that measures said speed and distance of said moving vehicle and generates said associated data parameters relating to said image, said measured distance being one of said associated data parameters;

a signal line that asserts a trigger signal causing a frame capture event by said video camera when said measured distance satisfies a predetermined distance condition set and stored within said system; and a database processor coupled to said video camera and said parameter detector that stores said captured frame of said image signal and said associated data parameters, if said speed of said moving vehicle exceeds a threshold speed value, and provides predetermined data parameter fields that can be searched by said database processor.

22. A system for recording an image of a moving vehicle and a set of parameters associated with said image, said moving vehicle moving at a speed relative to said system, comprising:

an image detector that produces an image signal representative of said image of said moving vehicle;

a parameter detector that generates a parameter signal representative of said parameters associated with said image, said parameter detector being capable of detecting said speed of said vehicle, said parameter detector being alignable with said image detector; and a local storage device having a removable storage medium that is capable of storing a plurality of said image signals and said parameters associated with said image, each set of parameters associated with an image including a visible reference indicator for identifying the alignment of said parameter detector within said image.

23. A system for storing an image of a moving vehicle and associated data parameters relating to said comprising:

an image detector that produces an image signal of said image;

a parameter detector that generates said associated data parameters relating to said image, said parameter detector being alignable to a location viewable within said image;

an image generator that displays live video of said image, and a reference indicator on said image corresponding to said location where said parameter detector is aligned.

24. A method of storing and retrieving images of moving vehicles and associated data parameters relating to said images comprising the steps of:

generating image signals representative of said images of said moving vehicles;

generating parameter signals representative of parameters associated with said image signals;

generating predetermined database parameter fields corresponding to said parameter signals, one of said predetermined database fields being a user-settable flag used for selective retrieval of said image signals and said parameter signals;

storing said image signals and said parameter signals;

setting said flag in one or more of said predetermined database fields; and retrieving in a single operation a plurality of said image signals and said parameter signals that correspond to said set flags.

25. A system for storing an image, a speed, and a distance of a moving vehicle, comprising:

a laser speed gun that emits a laser beam to measure said speed and said distance of said moving vehicle, said speed being measured relative to said laser speed gun, said distance being measured from said laser speed gun to said moving vehicle along the linear path of said laser beam;

a video camera that detects a video image of said moving vehicle;

a controller that triggers a capture of a frame of said video image when said measured distance satisfies a predetermined distance condition set and stored within said system; and a storage medium that associatively records said captured frame, said measured speed, and said measured distance.

26. The system of claim 25 further comprising a reference indicator representing the alignment of said laser beam on said moving vehicle in said image, said reference indicator being recorded in association with said image, said measured speed, and said measured distance on said storage medium.

27. A system having a field unit and a base unit for displaying an image of a moving vehicle, comprising:

a video camera disposed in said field unit that captures said image;

a laser speed gun disposed in said field unit that emits a laser beam and detects said speed and said distance of said moving vehicle; said speed being measured relative to said laser speed gun, said distance being measured between said laser speed gun to said moving vehicle along the linear path of said laser beam;

a first processing unit disposed in said field unit that produces an image signal representative of said image, a speed value representative of said speed, a distance value representative of said distance, and a reference indicator representing the alignment of said laser beam in said image; and a first image generator disposed in said field unit that displays said speed value, said distance value, and said reference indicator overlaying said image.

28. The system of claim 27 further comprising:

a first storage drive disposed in said field unit that receives a removable storage medium capable of associatively storing said image signal, said speed value, said distance value, and said reference indicator value;

a second storage device disposed in said base unit capable of receiving said removable storage medium;

a base controller disposed in said base unit that reads said image signal, said speed value, said distance value, and said reference indicator from said removable storage medium received therein; and a second image generator disposed in said base unit that displays said speed value, said distance value, and said reference indicator overlaying said image.

29. A method of automatically acquiring image information and measuring the speed of a moving vehicle in a speed detection and imaging system comprising the steps of:

setting a predetermined capture distance and a speed setting in said speed detection and imaging system;

calculating a capture window relative to said predetermined capture distance in accordance with a preset capture window value stored in a field unit of said speed detection and imaging system;

detecting the distance and speed of said moving vehicle relative to said system;

comparing said detected distance with said calculated capture window;

generating a trigger signal, responsive to the step of comparing said detected distance, if said detected distance is within said calculated capture window, regardless of the detected speed of the moving vehicle;

capturing an image of said moving vehicle, responsive to said trigger signal;

comparing said detected speed with a speed setting; and storing said captured image and said data parameters in a searchable database, responsive to the step of comparing said detected speed, only if said detected speed exceeds said speed setting.

* * * * *